UNITED STATES PATENT OFFICE.

RUFUS N. CHAMBERLAIN, OF CHICAGO, ILLINOIS.

SEPARATOR.

1,328,420. Specification of Letters Patent. Patented Jan. 20, 1920.

No Drawing. Application filed September 12, 1918. Serial No. 253,807.

*To all whom it may concern:*

Be it known that I, RUFUS N. CHAMBERLAIN, a citizen of the United States, and a resident of the city of Chicago, county of Cook, State of Illinois, have invented certain new and useful Improvements in Separators, of which the following is a specification.

My invention relates to separators for storage batteries and process of treating same, and particularly to separators of a fibrous structure which are treated to retard the action of the electrolyte of the battery upon the fibrous structure.

An object of my invention is to prolong the life of a separator and also to permit of the use of a thinner separator for the conservation of space and without sacrificing the life of the cell.

My invention includes separators of any fibrous material which has suitable porosity for use as a separator. This fibrous material is treated in accordance with the process hereinafter described to decrease its porosity to some extent by impregnating the mass with some suitable inert material which will not lose its desirable qualities when heated to a temperature considerably higher than the temperature to which it is subjected in the operation of the battery, such as for instance masticated rubber or similar material.

The following is a description of the process and material which I have used as an embodiment of my invention but I do not desire to be limited to the exact details or materials mentioned.

In carrying out the objects above specified, I have taken rubber and dissolved the same in naphtha by agitating or stirring the same to get a uniform consistency. The consistency to be used depends upon the nature of the use to which the separator is to be subjected; that is, if the battery in which the separator is to be used requires a high discharge rate, the separator should have a comparatively high conductivity, consequently the separator should have a relatively light impregnation, whereas if the battery in which the separator is to be used is to have a relatively low discharge rate, the separator may have a low conductivity and consequently, the separator may have a relatively greater impregnation. The degree of impregnation may be secured in one of two ways, that is by subjecting the separators to a solution of the same consistency for varying lengths of time or by subjecting the separators the same length of time to a solution of varying proportion of rubber and solvent, as will be readily understood.

I prefer in preparing the solution to so agitate it as to divide the rubber particles minutely so that the particles will penetrate the fibrous construction of the separator in such a manner that when the solvent evaporates or is driven off the separator will be permeated or impregnated with the particles of rubber. The degree of this impregnation will depend upon the amount and strength of solution taken up by the separator during the treatment.

After the solvent is prepared as above indicated a separator is subjected to the solution as by immersing the separator in the solution for a suitable length of time to give the impregnation desired. I prefer to have the separator thoroughly dried before treating it with the solution although this drying operation is not necessary to the success of the treatment. After the separator has been subjected to the solution for the required time, it is removed therefrom and the solvent of the solution permitted to evaporate or is driven off by artificial means so as to leave only the rubber particles within the separator. During the above treatment the outside surface of the separator is also thinly coated with rubber particles which are left on the outer surface upon the driving off of the solvent.

The treatment of the separator with the solution may be carried out in any suitable way, as for instance by use of a pressure machine or vacuum machine, all of which are well known for the purpose of impregnating fibrous material with solutions, &c. The particular way in which the solution is applied to the separator forms no part of the present invention.

In the treatment of separators on a large scale, it would be of advantage to condense the evaporated solvent taken from the separators and collect the same. This condensed solvent might then be used again for the same purpose or for any other desired purpose, thereby to that extent reducing the cost of carrying out the process.

It is found in practice that the separators deteriorate at their top before they do elsewhere due to the fact that they are not infrequently exposed to atmosphere and due to the evaporation and electrolysis of the water in the electrolyte at a point below the top of the separators. I may lessen this deterioration by subjecting the upper part of the separators to a greater impregnation in order to give to this part of the separator a greater protection than is necessary to give to the other part. This protection may be as great as desired because this part of the separator is substantially above the active part of the plates and consequently its degree of conductivity is more or less immaterial.

Aside from the advantages above given, the lower part of the separator which sometimes rests upon mechanical supports is given greater mechanical strength by the deposit of rubber and consequently adds to the life of the separator in that respect. In fact the upper and lower parts of the separator might be vulcanized so as to give additional mechanical strength to the separator at its non-conducting points. This vulcanizing might also be applied to the vertical edges of the separator to add mechanical strength at those points.

It may be that during the operation of the battery in which the rubberized separator is used that the heat generated in the normal operation of the battery together with the effect of the sulfuric acid of the electrolyte may cause some slight vulcanization of the rubber of the separator. If this takes place it will usually be after the separator has been in use for some time. This vulcanizing effect will tend to add mechanical strength to the separator to offset the deteriorating effect of the fibrous material during the same period of use.

I wish it to be understood that my invention is not to be limited to the use of rubber, but any material having the above outlined properties of rubber may be used and also any material which will act as a solvent may be used instead of naphtha. While I have used wood as the fibrous material for the separator, I desire not to be limited to wood but any material having fibrous construction may be employed as the foundation for the separator of my invention.

Having fully described my invention, what I claim as new and desire to secure by Letters Patent is:

1. A wood separator for storage batteries having substantially its natural properties with a film of unvulcanized rubber lining the pores thereof.

2. A wood separator for storage batteries having substantially its natural structural formation and containing its natural constituents, and protected throughout its structure by a thin lining of unvulcanized rubber not filling the pores.

3. A wood separator for storage batteries comprising a piece of wood of substantially its natural structural formation and porosity and having its fibers thinly coated with unvulcanized rubber to retard the action of electrolyte on the constituents thereof but not filling the pores.

4. A battery separator comprising a wood diaphragm, retaining substantially its natural porosity and having a film of unvulcanized rubber adapted to retard the action of the electrolyte upon the constituents of the wood without substantially affecting its natural permeability.

5. A porous wood separator for storage batteries having its pores lined with unvulcanized rubber.

6. A wood separator for storage batteries having substantially its natural structural formation with its fiber incased in unvulcanized rubber but not completely filling the pores.

7. A separator for storage batteries comprising a relatively thin plate of fibrous material having structural characteristics of wood and having a protective coating of unvulcanized rubber throughout its inner surfaces but not filling the pores.

8. A fibrous separator for storage batteries having structural characteristics of wood and a thin film of unvulcanized rubber disposed upon the surface of the inner fibers throughout but not filling the pores.

9. As an article of manufacture, an absorbent permeable separator having structural characteristics of wood and a thin coat of unvulcanized rubber intimately combined with the interior fibers thereof and rendering the same inert with respect to an electrolyte which enters the pores when the separator is immersed in such electrolyte.

10. As an article of manufacture, a fibrous separator for batteries, having structural characteristics of wood and the pores of which are open but thinly lined with unvulcanized rubber to protect the interior fibers from the electrolyte.

11. A separator for storage batteries comprising a piece of wood of natural composition and structure having its interior structure thinly coated with unvulcanized rubber.

12. The process which consists in dissolving rubber in a solvent and impregnating a separator throughout its interior fibrous structure with the solution so as to deposit said rubber within said separator and driving off said solvent.

13. The process of treating a separator which consists in subjecting it to rubber in solution to deposit the rubber within the separator and throughout its interior fibrous structure and driving off the solvent.

14. The process which consists in impregnating a separator with a rubber solution to deposit rubber particles on the interior fibrous structure of the separator.

15. The process of depositing rubber particles on the interior of a separator having structural characteristics of wood which consists in dissolving masticated rubber in a solvent-carrier, saturating the separator with the solution and driving off the solvent.

16. A fibrous separator for storage batteries having structural characteristics of wood and a thin film of unvulcanized rubber deposited upon the surface of the inner fibers throughout and not filling the pores, said separator also having its upper portion heavily protected with an acid inert material.

17. As an article of manufacture, a fibrous separator for batteries having the structural characteristics of wood, the pores of which are open but thinly lined with unvulcanized rubber throughout the active part of the separator to protect the interior fibers from the action of electrolyte, said separator having its top portion heavily protected by an acid inert material.

18. As an article of manufacture, a fibrous separator for batteries having the structural characteristics of wood, the pores of which are open but thinly lined with unvulcanized rubber throughout the active part of the separator to protect the interior fibers from the action of electrolyte, said separator having its top portion heavily protected by vulcanized rubber.

19. As an article of manufacture, a fibrous separator for batteries having the structural characteristics of wood, the pores of which are open but thinly lined with unvulcanized rubber throughout the active part of the separator to protect the interior fibers from the action of electrolyte, said separator having its inactive parts heavily protected by an acid inert material.

20. As an article of manufacture, a fibrous separator for batteries having the structural characteristics of wood, the pores of which are open but thinly lined with unvulcanized rubber throughout the active part of the separator to protect the interior fibers from the action of electrolyte, said separator having its inactive parts heavily protected by vulcanized rubber.

In testimony whereof, I have signed my name to this specification.

RUFUS N. CHAMBERLAIN.